US011331831B2

(12) United States Patent
Alvarez Quintana

(10) Patent No.: US 11,331,831 B2
(45) Date of Patent: May 17, 2022

(54) INSTALLATION FOR RECYCLING COMPOSITE MATERIALS WITH CARBON FIBER AND/OR GLASS FIBER REINFORCEMENT AND METHOD FOR RECYCLING IN SAID INSTALLATION

(71) Applicant: RECICLALIA, S.L., Madrid (ES)

(72) Inventor: Alejandro Alvarez Quintana, Madrid (ES)

(73) Assignee: RECICLALIA, S.L.

( * ) Notice: Subject to any disclaimer, the term of this patent is extended or adjusted under 35 U.S.C. 154(b) by 359 days.

(21) Appl. No.: 16/093,941

(22) PCT Filed: Apr. 10, 2017

(86) PCT No.: PCT/ES2017/070223
§ 371 (c)(1),
(2) Date: Oct. 15, 2018

(87) PCT Pub. No.: WO2017/178681
PCT Pub. Date: Oct. 19, 2017

(65) Prior Publication Data
US 2019/0248045 A1  Aug. 15, 2019

(30) Foreign Application Priority Data

Apr. 15, 2016 (ES) ................. ES201630474

(51) Int. Cl.
*C10J 3/20* (2006.01)
*C10J 3/72* (2006.01)
(Continued)

(52) U.S. Cl.
CPC ............ *B29B 17/02* (2013.01); *C10B 47/30* (2013.01); *C10B 53/07* (2013.01); *C10J 3/62* (2013.01);
(Continued)

(58) Field of Classification Search
CPC ........... C10B 1/06; C10B 47/36; C10B 47/40; C10B 47/44; C10B 53/07; C10B 7/14;
(Continued)

(56) References Cited

U.S. PATENT DOCUMENTS 3,668,077 A * 6/1972 Ban .................. F23G 5/0276
                                                     201/25
4,193,862 A * 3/1980 Ban .................. C10G 1/006
                                                     208/426
(Continued)

FOREIGN PATENT DOCUMENTS

CN       202246511       5/2012
DE       102007026748    6/2008
(Continued)

OTHER PUBLICATIONS

International Search Report for International Application No. PCT/ES2017/070223 dated Aug. 3, 2017.

*Primary Examiner* — Jonathan Luke Pilcher
(74) *Attorney, Agent, or Firm* — Kunzler Bean & Adamson

(57) ABSTRACT

The invention relates to a installation (4) for recycling composite materials comprising a horizontal reactor (5) with a first zone (1), second zone (2) and third zone (3), which are leak-tight and independent, aligned with and separated from one another by means of gates that allow the passage of the composite material to be recycled only when the process has ended in a previous zone. The first zone (1) comprises a rotation mechanism (9) for rotating the material and gas outlet means (8). The second zone (2) comprises air injectors (10) and gas outlet means (11). The third zone (3) comprises cooling means.

The invention also relates to a method for recycling composite materials comprising a first pyrolysis phase, a second (Continued)

gassing phase for gassing the material resulting from the first phase, and a third cooling phase for cooling the reinforcement material.

6 Claims, 2 Drawing Sheets

(51) Int. Cl.

| | | |
|---|---|---|
| C10B 47/36 | (2006.01) | |
| B29B 17/02 | (2006.01) | |
| C10B 53/07 | (2006.01) | |
| F27B 9/02 | (2006.01) | |
| F27B 9/04 | (2006.01) | |
| C10J 3/62 | (2006.01) | |
| C10B 47/30 | (2006.01) | |
| B29K 67/00 | (2006.01) | |
| B29K 105/06 | (2006.01) | |
| B29K 307/04 | (2006.01) | |
| B29K 309/08 | (2006.01) | |
| B29B 17/04 | (2006.01) | |

(52) U.S. Cl.
CPC .............. *F27B 9/028* (2013.01); *F27B 9/045* (2013.01); *B29B 2017/0496* (2013.01); *B29K 2067/00* (2013.01); *B29K 2105/06* (2013.01); *B29K 2307/04* (2013.01); *B29K 2309/08* (2013.01); *C10B 47/36* (2013.01); *C10J 3/20* (2013.01); *C10J 3/72* (2013.01); *C10J 2200/156* (2013.01); *Y02P 20/143* (2015.11); *Y02W 30/62* (2015.05)

(58) Field of Classification Search
CPC ....... C10J 3/002; C10J 3/36; C10J 3/40; C10J 3/42; C10J 2300/0946; C10J 3/721; C10J 2300/1631; C10J 2200/156; F23G 5/027; F23G 5/0273; F23G 5/0276; F23G 5/38; F23G 2201/30; F23G 2201/304; F23G 2203/70; F23G 2203/80–805; B09B 3/0083; C10G 1/10; B29B 2017/0496
See application file for complete search history.

(56) References Cited

U.S. PATENT DOCUMENTS

| | | | | |
|---|---|---|---|---|
| 4,250,158 A | * | 2/1981 | Solbakken | C10B 53/07 423/449.6 |
| 4,890,563 A | * | 1/1990 | White | C02F 11/10 110/246 |
| 5,195,449 A | * | 3/1993 | Michimae | C03B 3/02 110/225 |
| 6,332,909 B1 | * | 12/2001 | Teshima | C10B 7/14 75/401 |
| 7,922,871 B2 | * | 4/2011 | Price | F27B 9/045 201/36 |
| 2010/0189629 A1 | * | 7/2010 | Price | F27D 17/001 423/461 |
| 2016/0039118 A1 | | 2/2016 | Gehr | |

FOREIGN PATENT DOCUMENTS

| | | | | |
|---|---|---|---|---|
| EP | 0750944 | | 1/1997 | |
| EP | 2152487 | | 2/2010 | |
| WO | WO-2009090264 A1 | * | 7/2009 | ............... F27D 7/06 |

* cited by examiner

INSTALLATION FOR RECYCLING COMPOSITE MATERIALS WITH CARBON FIBER AND/OR GLASS FIBER REINFORCEMENT AND METHOD FOR RECYCLING IN SAID INSTALLATION

TECHNICAL FIELD OF THE INVENTION

The present invention corresponds to the technical field of materials recycling, specifically to the composite material recycling with carbon fiber and/or glass fiber reinforcement, said reinforcement being contained in a matrix together with which it forms said composite material.

BACKGROUND OF THE INVENTION

Composite materials are materials made up of two or more components, the properties of said composite material being superior to those of its constituent materials separately.

The composite materials are formed by two phases, a continuous phase referred to as matrix, and another dispersed phase referred to as reinforcement. The reinforcement provides mechanical properties to composite material whereas the matrix provides thermal and environmental resistance. The matrix and reinforcement are separated by the interface.

The composite materials market is experiencing continued growth each year, so in addition to being materials that are increasingly more present in daily life, they are also more present as residues once their service life ends.

To obtain maximum quality in recycling the constituents, it is necessary to recover the material in the form that is as similar as possible to its original form. Therefore, in the case of fibers coming from continuous fiber composite materials, it is necessary to recover the fibers in an almost continuous form and with a complete absence of residues coming from the matrix, such that said fibers can be utilized.

Most operations for recycling composite materials recover short fibers because processes are based on size reduction and fragmentation technologies. The recovered short fibers may only be used in preparing short fiber composite materials.

The two most commonly used methods for recycling composite materials today are the mechanical recycling, which destroys most of the properties of the base material, and incineration, which only allows energy recovery.

Reference patent documents EP0750944 and US2016039118 can be referred to as prior art examples.

Reference patent document EP0750944 discloses an ultra-high energy impact system for reducing the particle size of materials in a process for recycling same to an average diameter as small as about 40 µm, comprising a cooling station for cooling said materials to a temperature within the range of from about −40° C. to about −450° F.; a milling station for reducing the particle size of said cooled materials, said milling station including a rotor which operates at a tip speed within the range of from about 600 to about 1500 feet per second; and an atmosphere modifier for modifying the gaseous atmosphere within said milling station.

In this case, a system for milling materials previously cooled to a temperature less than the glass transition temperature of the material before being milled is described. During grinding, the materials are milled into particles of more or less the same size. It is thereby possible to completely mill the material into fine particles.

Therefore, this device does not allow later separation of the milled materials. Furthermore, the required very low cooling temperatures generate high process costs.

On the other hand, reference patent document US2016039118 discloses a pyrolysis plant for recovering carbon fibers from composite materials. This pyrolysis plant comprises an elongated pyrolysis furnace for the continuous pyrolysis of materials which operates continuously during operation, an input station for introducing material to be processed into the pyrolysis furnace at its one end, an output station for discharging recovered carbon fiber material from the pyrolysis furnace at its other end, a gas offtake device for pyrolysis gas produced in the pyrolysis furnace, and a control device for regulating at least individual constituents of the gas in the pyrolysis furnace.

This pyrolysis furnace is an indirectly heated rotary tube furnace which has at least the following constituents: an elongated rotary tube which forms the accommodation space for the material and is connected to the input station and the output station, with the rotary tube being provided on its cylindrical wall with exit openings for discharging pyrolysis gas formed during the pyrolysis over at least part of its length, and a housing which is insulated from the outside and at least partly surrounds the rotary tube and has openings for the input station and optionally also for the output station and has discharge lines for the pyrolysis gas.

A plurality of sections having different or differently regulatable gas temperatures are provided in the housing along the length of the rotary tube; wherein the exit openings in the rotary tube are provided at least in the section having the highest gas temperature. The pyrolysis furnace has various sections, namely at least one heating-up zone, a first pyrolysis zone, a second pyrolysis zone and a cooling zone.

The composition of the gas and the temperature in the pyrolysis furnace in the various sections of the rotary tube can be regulated differently, namely with a defined proportion of oxygen and with a defined temperature in the first pyrolysis zone and with a defined proportion of oxygen and with a defined temperature in the second pyrolysis zone.

In this case, oxygen is indeed used in the pyrolysis process, so comprehensive control of the atmosphere and internal temperature is required to prevent combustion from occurring.

Also, in this pyrolysis process, the input of the material, the heating thereof, the exit of the gases, the separation of the fibers and decomposition of the matrix, and the exit of said fibers are done in one and the same inner chamber of the furnace, in a continuous manner, such that the product to be recycled enters through one end of the chamber and the resulting products exit through the other end. This chamber furthermore rotates continuously.

Therefore, since the material is subjected to rotation at all times, from the beginning when it is a composite material until the final when it is decomposed into fibers and resins, lower final product quality is generated.

Furthermore, since the entire process is carried out continuously, the obtained result, given that all the material is kept in the chamber throughout the entire process and there is no clear separation between materials with higher or lower degree of separation of their constituent elements, it is the product itself which becomes intermingled in zones for the transition from controlled atmosphere conditions to other conditions and hinders greater process effectiveness.

DESCRIPTION OF THE INVENTION

The installation for recycling composite materials with carbon fiber and/or glass fiber reinforcement, said reinforcement being contained in a matrix together with the one forming said composite material herein described, comprises a horizontal reactor split into a first zone, a second zone and a third zone, which are leak-tight and independent, arranged aligned with and separated from one another by means of respective separation gates that allow the passage of the composite material to be recycled from a previous zone to the next zone only when the process has ended in said previous zone.

The first zone further comprises an intake gate for taking in the composite material, a rotation mechanism for rotating said composite material, and first gas outlet means for the gases generated by the decomposition of the matrix. The second zone comprises air injectors and second gas outlet means for the gases generated by air reacting with matrix residues, and the third zone comprises an outlet gate for the reinforcement material and cooling means for cooling the reinforcement material.

According to a preferred embodiment, the installation for recycling comprises a drive mechanism for the passage of the container housing the resulting composite from the first zone to the second zone.

According to a preferred embodiment, the installation comprises a drive mechanism for the passage of the container housing the resulting material from the second zone to the third zone.

In a preferred embodiment, the cooling means of the third zone are formed by a coil cooled by means of the passage of water.

According to another aspect, according to a preferred embodiment the horizontal reactor has a shell made of aluminum, at least on the inner surface thereof.

This specification in turn discloses a method for recycling composite materials with carbon fiber and/or glass fiber reinforcement by means of the installation defined above.

This method comprises a series of phases which are determined below.

A first phase consists of pyrolysis, wherein the composite material enters the first zone, which is leak-tight and independent of the horizontal reactor in which it is heated to a temperature comprised between 500 and 700° C. in a controlled atmosphere with an absence of oxygen, and with continuous rotational movement.

In this first phase, the matrix thermally decomposes without combusting. The composite resulting from this first phase is a combination of the reinforcement material and matrix residues. Likewise, gases are expelled due to the decomposition of the matrix.

To perform this phase, the gates of the first zone, i.e., the intake gate for taking in the composite material and the separation gate separating the first zone from the second zone are closed, and the material is processed by means of pyrolysis before it goes on to the second phase.

The polymer matrix of the composite material can be formed by any type of resin or even a polymer, polyester, vinyl ester, epoxy, bisphenol or melanine being included in the term "resin" or "polymer".

The reinforcing agent or reinforcement can consist of a glass fiber and/or carbon fiber.

The composite materials can contain other components in small proportions to improve or enhance any of their characteristics or to aid in the formation process, such as for example accelerants, colorants, fluidizers, catalysts, microspheres, foams, mold release agents, metal components or anti-UV components.

Therefore, the byproducts obtained from pyrolysis are condensable liquids resulting from thermal cracking of the matrix, so depending on the product going in, can be obtained phenols, aliphatic compounds, aromatic compounds, etc. The gases obtained in this phase, hydrocarbons for the most part, are not condensable.

This second phase consists of gassing the material resulting from the first phase, wherein when the process performed in the first zone ends, this resulting material enters the second zone, which is leak-tight and independent of the horizontal reactor in which air intake is performed at the same time the resulting material is heated to a temperature comprised between 500 and 700° C., keeping same in a fixed position.

It is therefore seen that the process of the second phase starts when the process of the first phase has ended, and the material resulting from same passes to the second zone. In this case, the gates of this second zone, i.e., the respective separation gates for separating the second zone from the first zone and the third zone, are likewise closed and the second phase now starts under those conditions.

The air introduced in this second phase reacts with matrix residues, generating the exit of gases due to said reaction, the material resulting from this second phase being the reinforcement material.

Finally, a third phase starts once the process performed in the second zone has ended and the reinforcement material enters said third zone, which is leak-tight and independent of the horizontal reactor. Cooling of the reinforcement material by cooling means is performed in this third zone.

During the process carried out in this third phase, the gates of the third zone, i.e., the separation gate separating the third zone from the second zone and the outlet gate for the reinforcement material are kept closed.

A significant improvement over the prior art is achieved with the installation for recycling composite materials with carbon fiber and/or glass fiber reinforcement herein proposed.

This is the result of the three zones of the installation which are leak-tight and independent; the method for recycling is carried out in three different consecutive phases where each of them starts when the previous one ends. Effective separation of the recyclable component and utilization of the gases are thereby achieved.

Glass fiber or carbon fiber, depending on the starting material is obtained as a product, avoiding the destruction and milling thereof.

The obtained product quality is much higher as a result, on one hand, of the fact that in the pyrolysis phase the composite material is continuously rotating in order to homogenize the working temperature in all the material to be decomposed, and on the other hand of the fact that in the second phase the material is subject to a process to remove the residues that may remain as a result of the first phase, thereby increasing final product quality.

As a result of the controlled atmosphere in the absence of oxygen of the first zone of the installation, the pyrolysis of the composite material with very high temperatures is possible, without actually combusting in a simple manner.

This all results in a simple and very effective installation for recycling and in a simple and very effective method for recycling in said installation.

BRIEF DESCRIPTION OF THE DRAWINGS

For the purpose of helping to better understand the features of the invention according to a preferred practical embodiment thereof, a series of drawings is provided as an integral part of said description in which the following is depicted with an illustrative and non-limiting character.

DETAILED DESCRIPTION OF A PREFERRED EMBODIMENT OF THE INVENTION

Figure 1:
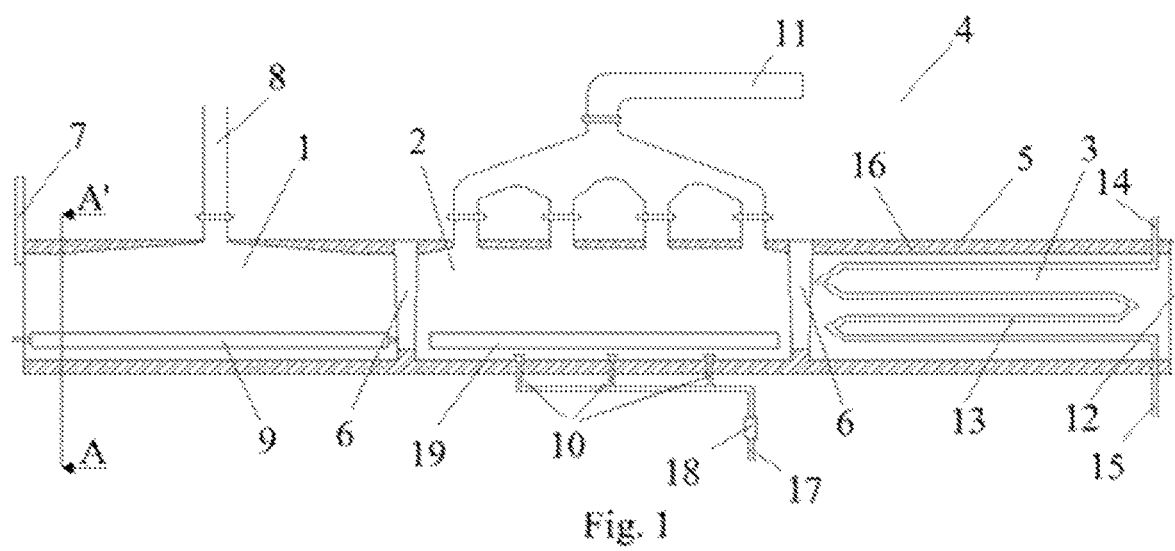
FIG. 1 shows a schematic view of a longitudinal section of the installation for recycling composite materials with carbon fiber and/or glass fiber reinforcement, for a preferred embodiment of the invention.

In view of the drawings, it can be seen how in a preferred embodiment of the invention, the installation 4 for recycling composite materials with carbon fiber and/or glass fiber reinforcement, said reinforcement being contained in a matrix together with the one forming said composite material herein proposed comprises a horizontal reactor 5 split into a first zone 1, a second zone 2 and a third zone 3, which are leak-tight and independent, arranged aligned with and separated from one another by means of respective separation gates 6 that allow the passage of the composite material to be recycled from a previous zone to the next zone only when the process has ended in said previous zone.

In this preferred embodiment of the invention, we consider that the composite material is formed by a polymer matrix, a polyester, for example, and a reinforcement consisting of carbon fiber.

As shown in FIG. 1, the first zone 1 comprises an intake gate 7 for taking in the composite material and first gas outlet means 8 for the gases generated by the decomposition of the matrix.

Figure 2:
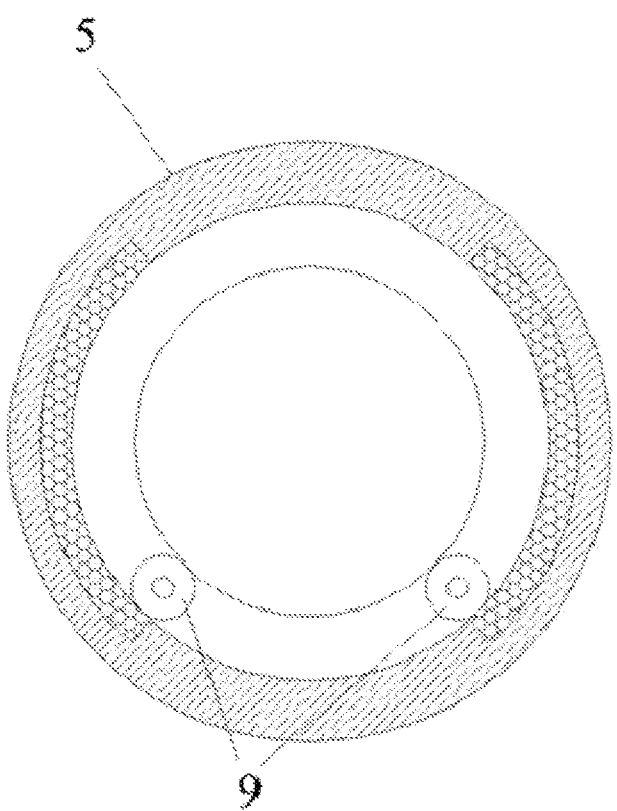
FIG. 2 shows a view of section A-A' of the installation for recycling composite materials with carbon fiber and/or glass fiber reinforcement for a preferred embodiment of the invention.

As can be seen in FIG. 2, this first zone 1 further comprises a rotation mechanism 9 for rotating the composite material to achieve a homogenous temperature throughout the material to be decomposed.

As shown in FIG. 1, the second zone 2 comprises air injectors 10 and second gas outlet means 11 for the gases generated by air reacting with matrix residues.

In this preferred embodiment of the invention, the air reaches the injectors through an air intake 17 with a flow rate regulator 18 for regulating the air flow. The injectors in this case have diffusers.

It can also be seen in said FIG. 1 that the third zone 3 comprises an outlet gate 12 for the reinforcement material and cooling means for cooling the reinforcement material, i.e., the carbon fiber that was part of the initial composite material.

In this preferred embodiment of the invention, said cooling means, as shown in FIG. 1, are formed by a coil 13 cooled by means of the passage of water introduced through a cooling water intake 14 and after running through the coil 13 cooling the reinforcement material, it exits through a cooling water outlet 15.

In this preferred embodiment of the invention, the installation 4 for recycling comprises a drive mechanism (not depicted in the drawings) for the passage of the resulting composite from the first zone 1 to the second zone 2, and likewise another drive mechanism (not depicted in the drawings) for the passage of the resulting material from the second zone 2 to the third zone 3.

The horizontal reactor 5 of this preferred embodiment of the invention has shell 16 made of aluminum, at least on the inner surface thereof.

This specification further proposes a method for recycling composite materials formed in this case by polyester with carbon fiber reinforcement by means of the installation 4 defined above. This method comprises a first phase, a second phase and a third phase.

The first phase is performed in the first zone 1 of the horizontal reactor 5 of the installation 4 for recycling, and in order for this first phase to start, the composite material enters said first zone 1 and the gates 6, 7 thereof are closed so that it is a zone that is leak-tight and independent of the second zone 2 arranged right after it.

In this first phase, pyrolysis is performed on the composite material, heating it to a temperature comprised between 500 and 700° C. in a controlled atmosphere with an absence of oxygen, and with continuous rotational movement to assure homogeneity of the temperature in the material.

The matrix formed by the polyester thereby thermally decomposes without combusting. The composite resulting from this first phase is a combination of the reinforcement material, in this case carbon fiber, and matrix residues, which are condensable liquids and non-condensable gases generated by decomposition of the matrix. These gases are pushed out by means of the first gas outlet means 8.

Once this pyrolysis process ends, the separation gate 6 between the first zone 1 and the second zone 2 is opened and the resulting material goes to said second zone 2, wherein the second phase of the method starts once this separation gate 6 is closed again, such that the second zone 2 is leak-tight and independent of the first zone 1 and the third zone 3, which are arranged before and after same.

This second phase consists of gassing the material resulting from the first phase by means of an air intake in the second zone 2 through air injectors 10. The air intake is performed at the same time the resulting composite is heated to a temperature comprised between 500 and 700° C. In this second phase, the material is arranged on a fixed support 19, such that it is kept in a fixed, non-rotating position.

The air that is introduced reacts with matrix residues, generating the exit of gases due to said reaction, the material resulting from this second phase being the reinforcement material, in this case carbon fiber.

Then once this phase ends, the separation gate 6 between the second zone 2 and the third zone 3 is opened and the reinforcement material obtained goes to said third zone 3. Now said separation gate 6 closes again. Since the outlet gate 12 is also kept closed, the third zone 3 is a zone which is leak-tight and independent and after that time the third phase of the method can start.

Said third phase consists of cooling the reinforcement material, i.e., the obtained carbon fiber, by the cooling means. Once cooled, the carbon fiber exits the third zone 3 through the outlet gate 12 and the process ends.

The described embodiment is only an example of the present invention. Therefore, the details, terms and specific phrases used herein must not be considered to be limiting, but rather must be understood only as a basis for the claims and as a representative basis providing a comprehensible description, and providing sufficient information to the person skilled in the art in order to apply the present invention.

Significant improvements are achieved over the prior art with the installation and method for recycling composite materials with carbon fiber and/or glass fiber reinforcement herein proposed.

Therefore, this installation, which allows performing three phases independently, allows for a reinforcement material with a higher quality than when the phases intermingle as they are performed in one and the same chamber continuously. At the same time, this installation allows reusing the gases resulting from the decomposition of the matrix. Furthermore, the fibers are obtained with the same nature that they had from the start, i.e., they are not cut or ground, so they can be reused in many uses.

Performing the three phases also contributes to a higher quality of the material obtained as a result of the rotation of the material performed in the first phase and the fixed position it keeps in the second.

All this results in an installation for recycling and a method for recycling that are very effective, resulting in a high quality reinforcement material and gases that can be reused, and all this at a low cost and with enormous simplicity of the installation.

The invention claimed is:

1. An installation for recycling composite materials with carbon fiber and/or glass fiber reinforcement, wherein said reinforcement is contained in a matrix with which said composite material is formed, the installation comprising a horizontal reactor split into a first zone, second zone and third zone, which are leak-tight and independent, arranged aligned with and separated from one another by means of respective separation gates that allow the passage of the composite material to be recycled from a previous zone to the next zone only when the process has ended in said previous zone, wherein:
   the first zone comprises an intake gate for taking in the composite material, a rotation mechanism for rotating said composite material and a first gas outlet means for the gases generated by the decomposition of the matrix, wherein the first zone provides a controlled atmosphere, having an absence of oxygen, and heats the composite material in the controlled atmosphere to a temperature between 500° C. and 700° C.;
   the second zone comprises air injectors and second gas outlet means for the gases generated by air reacting with matrix residues, wherein the second zone introduces air to composite material, received in the second zone from the first zone after the composite material is heated in the first zone, concurrently heats the composite material in the second zone to a temperature between 500° C. and 700° C., converts the matrix of the composite material into gases due to a reaction of the air with the matrix, and expunges the gases, from the second zone, through the second gas outlet means of the second zone, thus leaving only reinforcement material in the second zone; and
   the third zone comprises an outlet gate for expelling reinforcement material, received in the third zone from the second zone, and cooling means for cooling the reinforcement material in the third zone before expelling the reinforcement material from the third zone through the outlet gate, wherein the cooling means comprises a coil, a cooling water intake, and a cooling water outlet, and wherein the coil is cooled by the passage of water from the cooling water intake, through the coil, and to the cooling water outlet.

2. The installation for recycling composite materials with carbon fiber and/or glass fiber reinforcement according to claim 1, wherein the horizontal reactor has a shell made of aluminum, at least on an inner surface thereof.

3. A method for recycling composite materials with carbon fiber and/or glass fiber reinforcement, wherein said reinforcement is contained in a matrix with which said composite material is formed and wherein the method comprises:
   providing an installation comprising a horizontal reactor split into a first zone, second zone and third zone, which are leak-tight and independent, arranged aligned with and separated from one another by means of respective separation gates that allow the passage of the composite material to be recycled from a previous zone to the next zone only when the process has ended in said previous zone, wherein:
      the first zone comprises an intake gate for taking in the composite material, a rotation mechanism for rotating said composite material and a first gas outlet means for the gases generated by the decomposition of the matrix; wherein the first zone provides a controlled atmosphere, having an absence of oxygen;
      the second zone comprises air injectors and second gas outlet means for the gases generated by air reacting with matrix residues, wherein the second zone introduces air to composite material; and
      the third zone comprises an outlet gate and cooling means for cooling the reinforcement material, wherein the cooling means comprises a coil, a cooling water intake, and a cooling water outlet, and wherein the coil is cooled by the passage of water from the cooling water intake, through the coil, and to the cooling water outlet;
   performing a first phase consisting of pyrolysis, wherein the composite material enters the first zone, which is leak-tight and independent of the horizontal reactor in which it is heated to a temperature comprised between 500 and 700° C. in the controlled atmosphere with an absence of oxygen, and with continuous rotational movement;
      wherein in this first phase, the matrix thermally decomposes without combusting, generating an exit of gases due to the decomposition thereof, the composite resulting from this first phase being a combination of the reinforcement material and matrix residues;
   performing a second phase consisting of gassing the material resulting from the first phase, wherein when the process performed in the first zone ends, the resulting material enters the second zone, which is leak-tight and independent of the horizontal reactor in which air intake is performed at the same time the resulting composite is heated to a temperature comprised between 500 and 700° C., keeping same in a fixed position;
      wherein the air introduced in this second phase reacts with the matrix residues, generating the exit of gases due to said reaction, the material resulting from this second phase being only reinforcement material, wherein the second phase comprises expunging the gases from the second zone through the second gas outlet means; and
   performing a third phase consisting of the entrance of the reinforcement material in the third zone, which is leak-tight and independent of the horizontal reactor, when the process performed in the second zone ends, it being in this third zone where the cooling of the reinforcement material by the cooling means is performed, and wherein the third phase comprises expelling the reinforcement material from the third zone through the outlet gate.

4. The method according to claim 3, further comprising moving the composite material from the first zone to the second zone.

5. The method according to claim 3, further comprising moving the reinforcement material from the second zone to the third zone.

6. The method according to claim 3, wherein the horizontal reactor has a shell made of aluminum, at least on an inner surface thereof.

* * * * *